US012632829B2

(12) United States Patent
Uniyal et al.

(10) Patent No.: US 12,632,829 B2
(45) Date of Patent: May 19, 2026

(54) RECONCILING CONFIGURATIONS ACROSS ELECTRONIC CONFIGURATION PLATFORMS

(71) Applicant: SAP SE, Walldorf (DE)

(72) Inventors: Ajay Krishna Uniyal, Tehri Garhwal/Uttarakhand/Kumalda (IN); Jai Shree Seth, Bangalore (IN); Anoochan Pandey, Gorakhpur (IN); Aditya Karanth, Bangalore (IN); Pooja Gupta, Bangalore (IN); Edwin Felix Retnam, Hyderabad (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/914,832

(22) Filed: Oct. 14, 2024

(65) Prior Publication Data

US 2026/0105412 A1 Apr. 16, 2026

(51) Int. Cl.
G16H 10/00 (2018.01)
G06Q 10/10 (2023.01)
G16H 15/00 (2018.01)

(52) U.S. Cl.
CPC .................................. G06Q 10/10 (2013.01)

(58) Field of Classification Search
CPC ...................................................... G06Q 10/10
See application file for complete search history.

(56) References Cited

U.S. PATENT DOCUMENTS

2024/0119045 A1* 4/2024 Aggarwal ......... G06F 16/24556
2025/0238606 A1* 7/2025 Jooma ..................... G06V 30/42

* cited by examiner

*Primary Examiner* — Maroun P Kanaan
(74) *Attorney, Agent, or Firm* — Sterne, Kessler, Goldstein & Fox P.L.L.C.

(57) ABSTRACT

Disclosed herein are system, method, and computer program product embodiments for generating an electronic report using a unified electronic report generation platform. An embodiment operates by establishing a secure communication framework with an electronic report generation platform. A template reporting entity is assigned to a reporting entity implemented by the electronic report generation platform. A plurality of configurations corresponding to the template reporting entity are generated. The reporting entity is then mapped to the template reporting entity through metadata stored in a mapping configuration table. The electronic report generation platform is then queried for another plurality of configurations corresponding to the reporting entity. An electronic report is then generated for an obligatory reporting agency using the plurality of configurations corresponding to the template reporting entity and the plurality of configurations corresponding to the reporting entity implemented by the electronic report generation platform.

20 Claims, 6 Drawing Sheets

Figure 1:
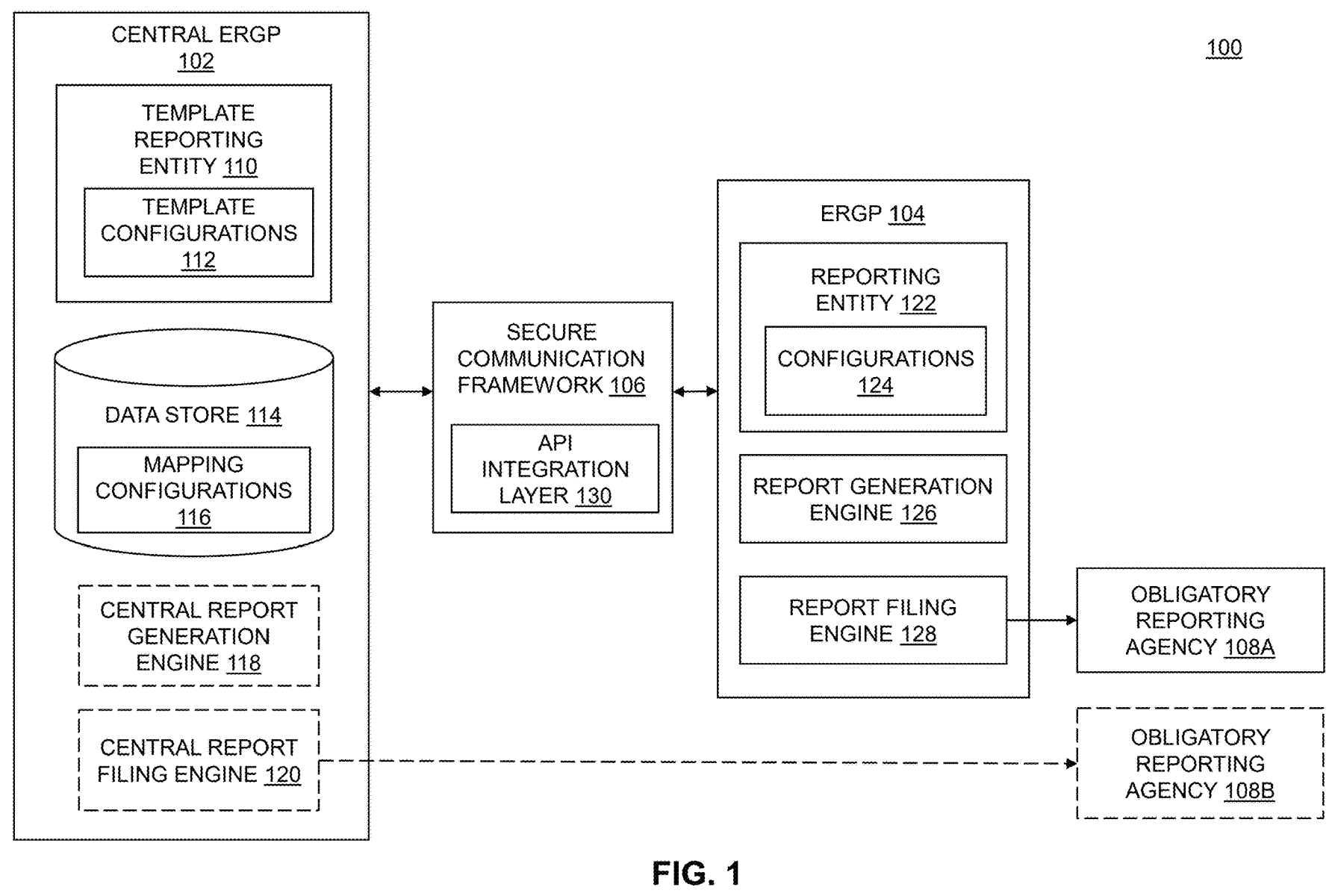

100

CENTRAL ERGP 102

TEMPLATE REPORTING ENTITY 110

TEMPLATE CONFIGURATIONS 112

DATA STORE 114

MAPPING CONFIGURATIONS 116

CENTRAL REPORT GENERATION ENGINE 118

CENTRAL REPORT FILING ENGINE 120

SECURE COMMUNICATION FRAMEWORK 106

API INTEGRATION LAYER 130

ERGP 104

REPORTING ENTITY 122

CONFIGURATIONS 124

REPORT GENERATION ENGINE 126

REPORT FILING ENGINE 128

OBLIGATORY REPORTING AGENCY 108A

OBLIGATORY REPORTING AGENCY 108B

Figure 2:
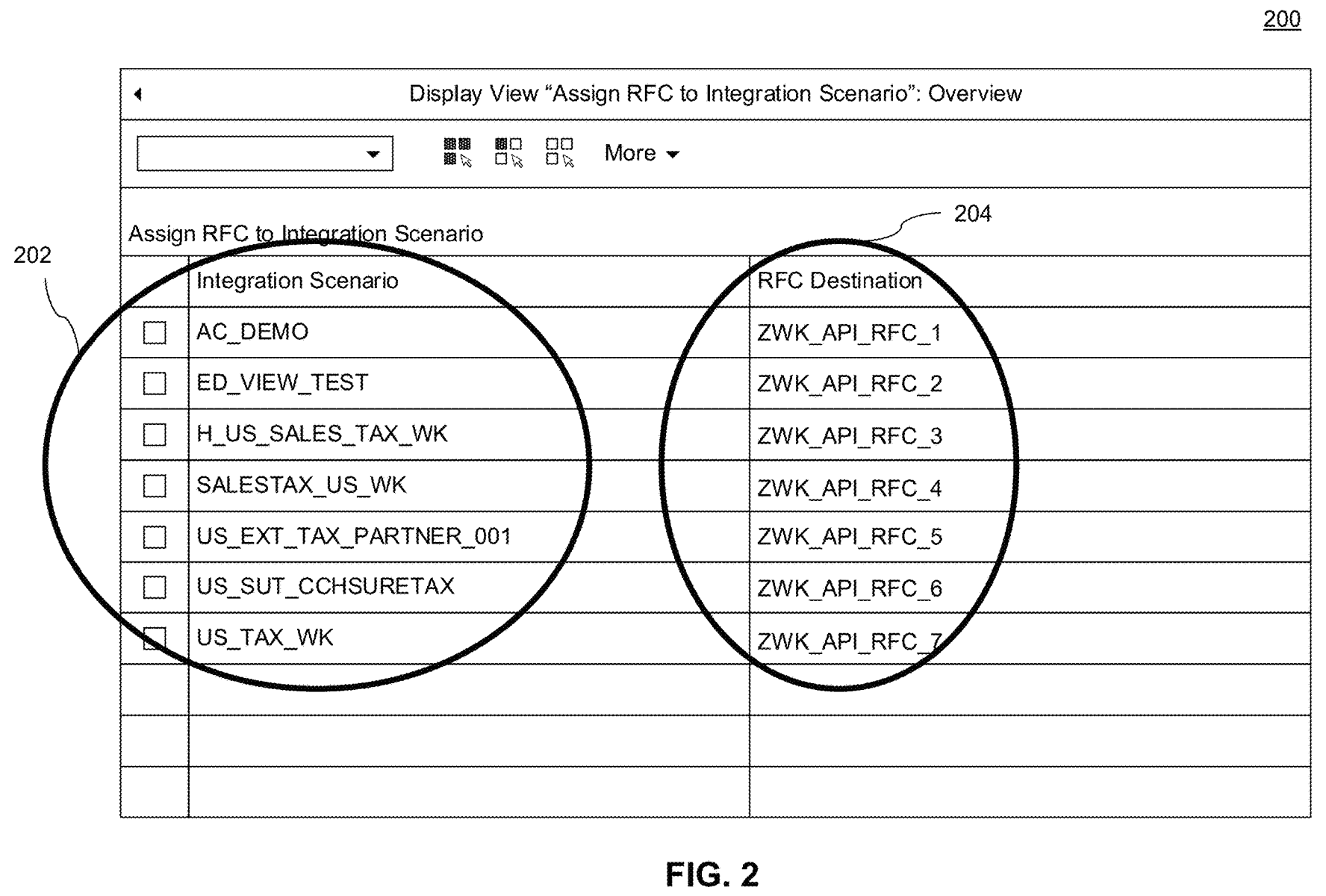

Display View "Assign RFC to Integration Scenario": Overview

▶

More ▶

Assign RFC to Integration Scenario

204

| | Integration Scenario | RFC Destination |
|---|---|---|
| ☐ | AC_DEMO | ZWK_API_RFC_1 |
| ☐ | ED_VIEW_TEST | ZWK_API_RFC_2 |
| ☐ | H_US_SALES_TAX_WK | ZWK_API_RFC_3 |
| ☐ | SALESTAX_US_WK | ZWK_API_RFC_4 |
| ☐ | US_EXT_TAX_PARTNER_001 | ZWK_API_RFC_5 |
| ☐ | US_SUT_CCHSURETAX | ZWK_API_RFC_6 |
| ☐ | US_TAX_WK | ZWK_API_RFC_7 |

Display View "Reporting Entity in Integration Solution": Overview

▼

[      ▶ ]    [      ]

More ▶

Dialog Structure

▶  Reporting Entity in Integrated Solution
    ☐ Mapping Between Reporting Entities Integration Scenario:   [ SALESTAX_US_WK ]    WK Integration

Reporting Entity in Integrated Solution

| | Reporting Entity in Integration Solution | Reporting Entity Name in Integrated Solution | Inactive |
|---|---|---|---|
| ☐ | 000000069 | Concur | ☐ |
| ☐ | 000000070 | America | ☐ |
| ☐ | 000005928 | TestNow | ☐ |
| ☐ | 000005929 | TestNow | ☐ |
| ☐ | 000005932 | SKItest | ☐ |
| ☐ | 000005958 | Video | ☐ |
| ☐ | 000005961 | DRC TEST LFE | ☐ |
| ☐ | 000005963 | TEST ADM | ☐ |

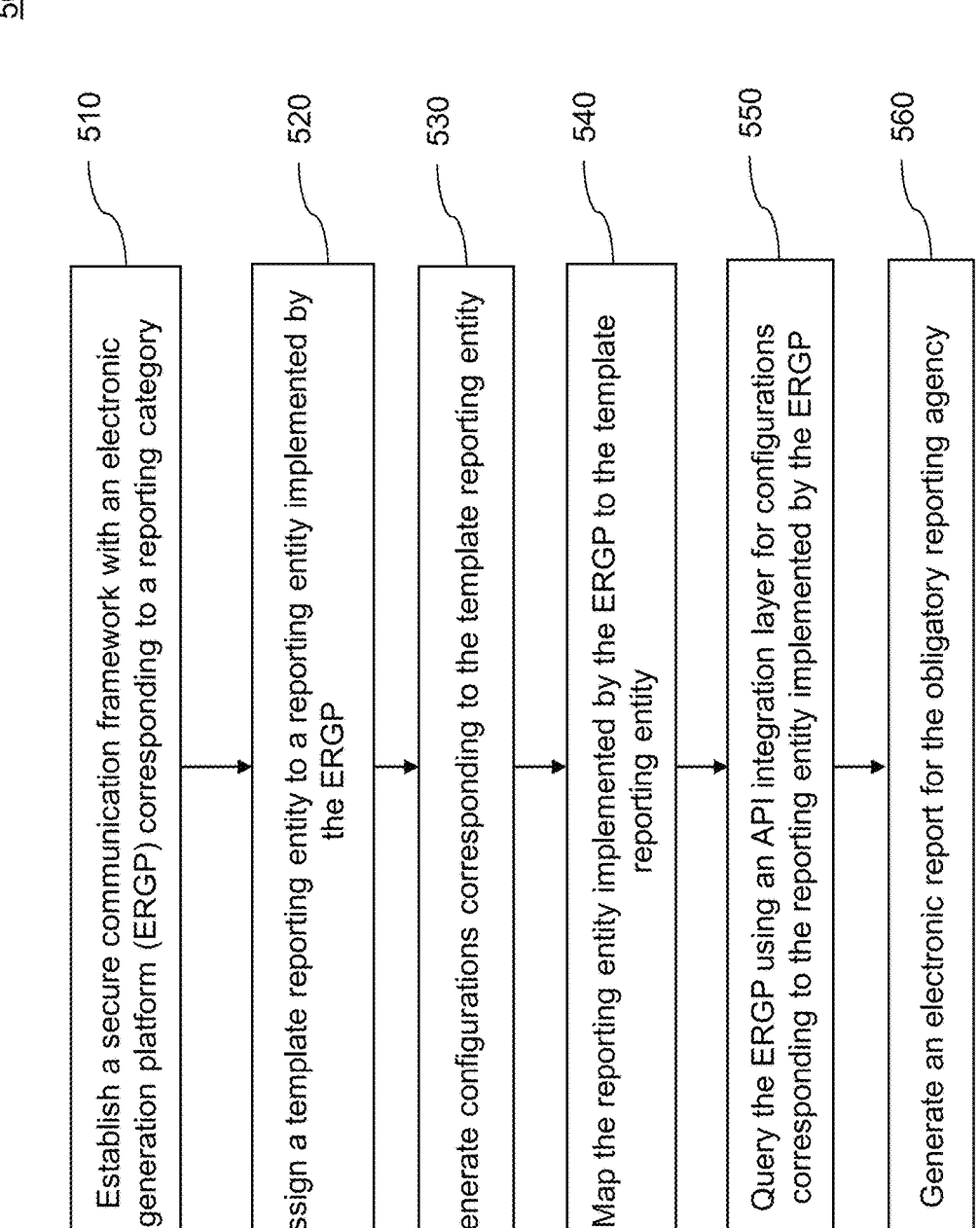

500

510 Establish a secure communication framework with an electronic generation platform (ERGP) corresponding to a reporting category 520 Assign a template reporting entity to a reporting entity implemented by the ERGP 530 Generate configurations corresponding to the template reporting entity 540 Map the reporting entity implemented by the ERGP to the template reporting entity 550 Query the ERGP using an API integration layer for configurations corresponding to the reporting entity implemented by the ERGP 560 Generate an electronic report for the obligatory reporting agency

FIG. 5

RECONCILING CONFIGURATIONS ACROSS ELECTRONIC CONFIGURATION PLATFORMS

BACKGROUND

As technology evolves, institutions have found ways to make electronic report generation and submission more streamlined. For example, in the statutory reporting scene, electronic report generation platforms (ERGPs) offer electronic report generation services across various formats and provide tools for transforming data to comply with local regulations. However, due to the various data formats and requirements for statutory reporting across different jurisdictions, various ERGPs have developed different internal configurations and conventions that have been optimized to these formats and requirements. These diverse formats make it technologically problematic for one ERGP to implement and report generation services for every jurisdiction and scalably support all configurations simultaneously.

BRIEF DESCRIPTION OF THE DRAWINGS

The accompanying drawings are incorporated herein and form a part of the specification.

FIG. 1 illustrates an example block diagram of a unified electronic report generation platform (ERGP), according to some embodiments.

FIG. 2 illustrates an example secure communication framework assignment, according to some embodiments.

FIG. 3 illustrates an example reporting entity mapping table, according to some embodiments.

FIG. 5 illustrates an example flow diagram of a method, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 4:
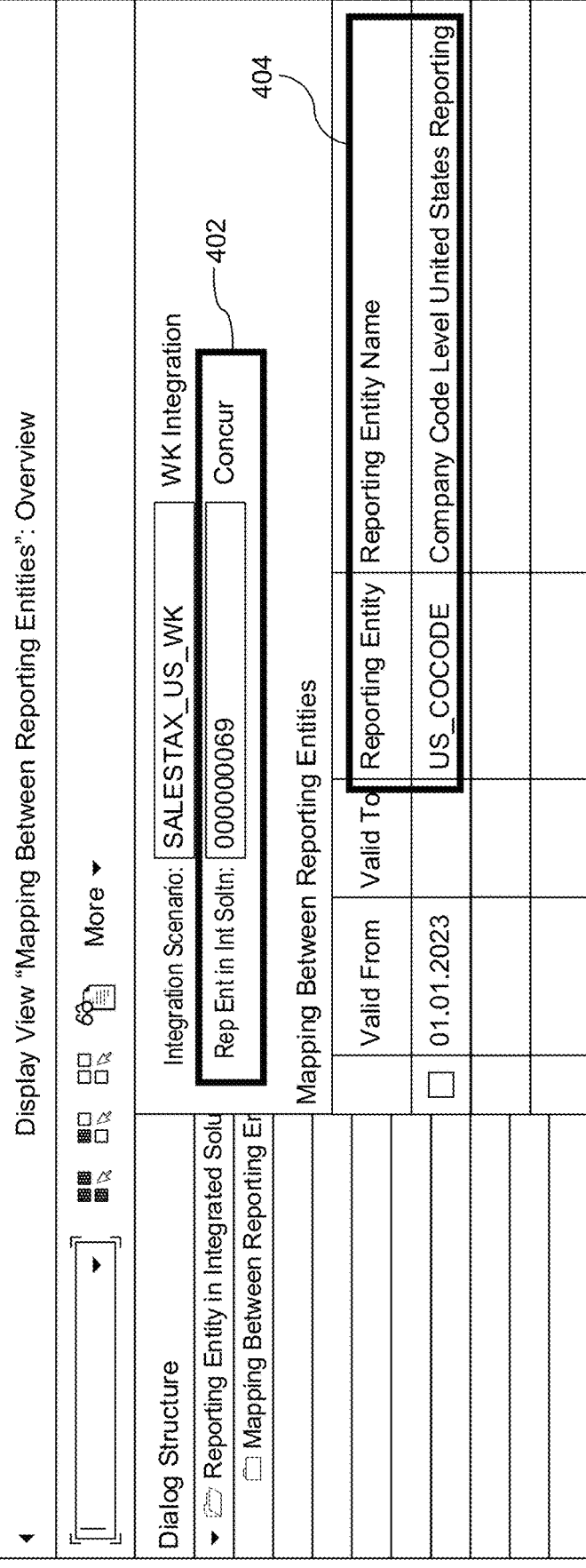
FIG. 4 illustrates an example reporting entity mapping, according to some embodiments.

Provided herein are system, apparatus, device, method and/or computer program product embodiments, and/or combinations and sub-combinations thereof, for generating an electronic report using a unified electronic report generation platform.

As technology evolves, institutions have found ways to make electronic report generation and submission more streamlined. For example, in the statutory reporting scene, electronic report generation platforms (ERGPs) offer electronic report generation services across various formats and provide tools for transforming data to comply with local regulations. However, due to the various data formats and requirements for statutory reporting across different jurisdictions, various ERGPs have developed different internal configurations and conventions that have been optimized to these formats and requirements. These diverse formats make it technologically problematic for one ERGP to implement report generation services for every jurisdiction and scalably support all configurations simultaneously.

These factors introduce the technical problem of data incohesion and data heterogeneity when different ERGPs configure and implement their report generation processes.

In other words, with current methods, there is a technological barrier for one ERGP to leverage the optimized configurations and report generation pipelines of other ERGPs. As such, entities seeking compliance are obligated to utilize multiple solutions to meet compliance standards across multiple jurisdictions, leading to increased, redundant computations, reduced efficiency, and reduced security.

System, apparatus, device, method and/or computer program product embodiments here solve these technological problems by unifying the electronic report generation process and leveraging pre-existing optimized configurations across multiple electronic report generation platforms. Such techniques may leverage data processing and communication techniques to achieve this purpose, thereby solving a complex task and delivering more value to the customer base.

For example, a unified ERGP may establish a secure communication framework between a central ERGP and an ERGP corresponding to a reporting category and reporting agency that are not directly associated with the central ERGP. The unified ERGP may then assign a template reporting entity to a reporting entity implemented by the ERGP. The unified ERGP may then generate configurations corresponding to the template reporting entity. The unified ERGP may then map the reporting entity implemented by the ERGP to the template reporting entity. The unified ERGP may then query the ERGP for configurations corresponding to the reporting entity implemented by the ERGP. The unified ERGP may then generate an electronic report for the reporting agency using the configurations corresponding to the template reporting entity and the configurations corresponding to the reporting entity implemented by the ERGP.

The techniques described herein improve the functioning of a computing system. For example, by leveraging configurations of a reporting entity implemented by an ERGP, new electronic report submission pipelines are created for previously inaccessible reporting categories and reporting agencies. As such, electronic reports for reporting categories and reporting agencies that were not directly associated with the central ERGP can be generated and utilized immediately, thereby enabling the central ERGP and/or unified ERGP to run more efficiently. Accordingly, various compute resources, which would have otherwise been required to generate and utilize new, unoptimized electronic report submission pipelines, are conserved as a result.

FIG. 1 illustrates an example block diagram of a unified electronic report generation platform (ERGP) 100, according to some embodiments. Operations described may be implemented by processing logic that may comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

In some embodiments, unified ERGP 100 may include central ERGP 102, ERGP 104, and secure communication framework 106. Central ERGP 102 may be communicatively coupled to ERGP 104 via secure communication framework 106. As shown in FIG. 1, central ERGP 102 includes template reporting entity 110, data store 114, central report generation engine 118, and central report filing engine 120. ERGP 104 may include reporting entity 122, report generation engine 126, and report filing engine 128. Secure communication framework 106 may include application programming interface (API) layer 130. Alternatively or in addition, secure communication framework may comprise one or more networks such as local area networks (LANs), wide area networks (WANs), enterprise networks, the Internet, etc., and may include one or more of wired and/or wireless portions. In some embodiments, secure communication framework may serve as a unique endpoint with ERGP 104 and include an authentication mechanism.

Central ERGP 102 may be implemented by processing logic that can comprise hardware (e.g., circuitry, dedicated logic, programmable logic, microcode, etc.), software (e.g., instructions executing on a processing device), or a combination thereof. In an embodiment, central ERGP 102 is implemented in one or more software processes executing on one or more processor-based computer systems, such as computer system 600 as described below in reference to FIG. 6.

In some embodiments, an entity (e.g. a business user, a customer, etc.) of an organization, such as an enterprise or business, may wish to generate and file an electronic report to maintain compliance. In some embodiments, central ERGP 102 may leverage central report generation engine 118 to generate the report. Central ERGP 102 may then file the report with obligatory reporting agency 108B via central report filing engine 120. Electronic reports may refer to any mandatory submission of financial and non-financial information to a government agency. Typically, electronic reports may be sent to government entities for reporting and evaluation by reporting entities to maintain compliance. Various examples of electronic reports may include, but are not limited to, balance sheets, income statements, cash flow statements, shareholder equity statements, and tax reporting documents.

Template reporting entity 110 may include various template configurations 112 useful for generating an electronic report. For example, template configurations 112 may include an organizational unit, such as but not limited to, a company code, a jurisdiction code, a profit center, etc. Template configurations 112 may also include a reporting category which may define a reporting jurisdiction (e.g. Great Britain, Australia, Denver, etc.) and/or a report type (e.g. value added tax, withholding tax, cash flow statements, etc.).

ERGP 104 may be implemented by processing logic that can comprise hardware (e.g., circuitry, dedicated logic, programmable logic, microcode, etc.), software (e.g., instructions executing on a processing device), or a combination thereof. In an embodiment, ERGP 104 is implemented in one or more software processes executing on one or more processor-based computer systems, such as computer system 600 as described below in reference to FIG. 6. In some embodiments, ERGP 104 may be an external ERGP or a partner ERGP with respect to central ERGP 102. In some embodiments, ERGP 104 may be a separately implemented internal ERGP with respect to central ERGP 102.

Reporting entity 122 may include various configurations 124 useful for generating an electronic report. Configurations 124 may be optimized for electronic reporting with a designated obligatory reporting agency 108A. For example, configurations 124 may include frequency configurations (e.g. bi-weekly, weekly, monthly, bi-monthly, quarterly, half yearly, yearly, etc.), a reporting year, a reporting country, and a report due date. Alternatively or in addition, configurations 124 may also include a reporting start date, a reporting end date, and a reporting period number that identifies the current reporting period. For example, with a monthly frequency configuration the reporting start date may be February 2024, and the reporting end date may be January 2025. In this example, the reporting period number for February 2024 may be 01; the reporting period number for March 2024 may be 02, and so on, until January 2025, which may have a reporting period number of 12.

In some embodiments, configurations 124 may also include a reporting phase. A reporting phase may further identify the type of report being submitted to an obligatory reporting agency (e.g. obligatory reporting agency 108A). For example, a "Declaration" phase may identify a phase where an initial report is generated based on financial data. A "Correction" phase may identify a phase where an error is found in a "Declaration" phase, and a corrected report is generated. An "Additional Correction" phase may identify a phase where additional corrections need to be made after an initial "Correction" phase, and a further corrected report is generated. A "Clarification" phase may identify a phase where a reporting agency requests additional information about a report submitted during a "Declaration", "Correction", or "Additional Correction" phase, and an appropriate response or report is submitted.

In some embodiments, central ERGP 102 may assign template reporting entity 110 to reporting entity 122. For example, reporting entity 122 may be associated with the "Great Britain" reporting jurisdiction. Central ERGP 102 may then assign a template reporting entity 110 with template configurations 112 that designate a reporting jurisdiction of "Great Britain." In some embodiments, template reporting entity 110 may be reused for a reporting entity implemented by another ERGP (not shown). For example, the other ERGP may also be associated with the "Great Britain" reporting jurisdiction, but implement a completely different set of specialized configurations than configurations 124. Central ERGP 102 may assign template reporting entity 110 to the reporting entity implemented by the other ERGP. This has the effect of both reporting entity 122 and the reporting entity implemented by the other ERGP being assigned the same template reporting entity 110, but implementing different configurations respective to their ERGP, context, and/or business topic. Through sharing a baseline set of configurations, various compute resources may be conserved across multiple ERGPs.

Data store 114 may represent a data store that stores mapping configurations 116 for an entity. Mapping configurations 116 may include metadata stored in one or more mapping configuration tables that map one or more reporting entities (e.g. reporting entity 122) to one or more template reporting entities (e.g. template reporting entity 110). Data store 114 may be stored, for example, in a volatile memory (e.g. random access memory (RAM)), a non-volatile storage device (e.g. a disk), or in a distributed and/or redundant manner across multiple memories and/or storage devices. In an embodiment, data store 114 is managed by and accessed via a corresponding database management system (DBMS), which is not shown in FIG. 1 for the sake of simplicity. Data store 114 and the corresponding DBMS may be implemented on one or more computer systems, such as computer system 600 as described below in reference to FIG. 6. Data store 114 and the corresponding DBMS may also be implemented on one or more servers of an enterprise network and/or a cloud computing network and accessed via a client computer system that is connected thereto, although these examples are not intended to be limiting.

API integration layer 130 may define an established communication scenario between central ERGP 102 and ERGP 104. In some embodiments, API integration layer 130 may include queries for obtaining reporting entity 122, obtaining a list of reports that are due, generating new reports, polling a report generation status, submitting reports, polling a report submission status, deleting reports, etc. In some embodiments, API integration layer 130 may also include queries for obtaining report details, viewing a report, editing a report, and/or obtaining a report download URL.

In some embodiments, central ERGP 102 may generate a new electronic report by transmitting or sending a report generation query or request to ERGP 104 via API integration layer 130. In some embodiments, central ERGP 102 may forward template configurations 112 with the query to generate the report. Upon receiving the report generation request, ERGP 104 may leverage report generation engine 126 to generate the electronic report. In some embodiments, report generation engine 126 may include template configurations 112 and/or configurations 124 to generate the electronic report. In some embodiments, central ERGP 102 may automatically and/or periodically transmit a query for polling a report generation status to ERGP 104 after transmitting the report generation query. For example, the periodic polling may be implemented using an experimental backoff function. After ERGP 104 successfully generates a report, central ERGP 102 may receive a successful report generation status. In some embodiments, central ERGP 102 may transmit a query to ERGP 104 to view a generated electronic report in response to a successful report generation status. Alternatively or in addition, central ERGP 102 may transmit a query to ERGP 104 to obtain a URL to download the generated electronic report.

In some embodiments, central ERGP 102 may submit the generated electronic report to obligatory reporting agency 108A after generating the report. For example, central ERGP 102 may transmit a query to ERGP 104 to submit the electronic report. In some embodiments, central ERGP 102 may transmit a query for viewing and editing a report to embed an electronic report inside an editable electronic report visualization for a user. In such embodiments, whenever the user makes an edit to the embedded electronic report through the editable electronic report visualization, central ERGP 102 may forward the edit to ERGP 104 via API integration layer 130 to mirror the edit at ERGP 104. After edits are finalized, central ERGP 102 may transmit a query to ERGP 104 to submit the edited electronic report.

Central ERGP 102, ERGP 104, and secure communication framework 106 may be instantiated on one or more computer systems, such as computer system 600 as described below in reference to FIG. 6. Central ERGP 102, ERGP 104, and secure communication framework 106 may also be implemented on one or more servers of an enterprise network and/or a cloud computing network and accessed via a client computer system that is connected thereto, although these examples are not intended to be limiting.

FIG. 2 illustrates an example secure communication framework assignment 200, according to some embodiments. In 202, various ERGPs may be depicted (e.g., "AC_DEMO," "ED_VIEW_TEST," "H_US_SALES_TAX_WK," "SALESTAX_US_WK," "US_EXT_TAX_PARTNER_001," "US_SUT_CCHSURETAX," and "US_TAX_WK"). In 204, various secure communication frameworks may be depicted (e.g., "ZWK_API_RFC_1," "ZWK_API_RFC_2," "ZWK_API_RFC_3," "ZWK_A-PI_RFC_4," "ZWK_API_RFC_5," "ZWK_API_RFC_6," and "ZWK_API_RFC_7". In some embodiments, example secure communication framework assignment 200 may depict the unique secure communication frameworks that are assigned to the various ERGPs.

FIG. 3 illustrates an example reporting entity mapping table 300, according to some embodiments. Entity mapping table 300 may depict the various reporting entities in an ERGP (e.g., ERGP 104 of FIG. 1) that are available to be mapped to a template reporting entity (e.g., template reporting entity 110 of FIG. 1). In a non-limiting example, entity mapping table 300 may be depicted after a configuration user selects a "SALESTAX_US_WK" ERGP within a secure communication framework assignment (e.g., secure communication framework assignment 200 of FIG. 2). In 302, various reporting entities of an ERGP may be depicted. In 304, various reporting entity names of an ERGP may be depicted.

FIG. 4 illustrates an example reporting entity mapping 400, according to some embodiments. In 402, a reporting entity of an ERGP may be selected. In 404, a template reporting entity of a central ERGP may be selected. Entity mapping 400 may assign the selected reporting entity of the ERGP to the selected template reporting entity of the central ERGP. In some embodiments, entity mapping 400 may map the reporting entity to the template reporting entity by writing metadata into a mapping configuration table. The mapping configuration table may be stored inside a data store of the central ERGP (e.g., data store 114). The metadata may then be accessed at a later time, for example, when an electronic report corresponding to the reporting entity is generated.

As with the examples described in FIGS. 3-5, specific reporting entity mapping examples have been described herein. However, they are not meant to represent an exhaustive list of possible implementations. The scope of the technology disclosed herein is not limited to only these examples.

FIG. 5 illustrates an example flow diagram of a method 500 for generating an electronic report that can be carried out in line with the discussion above, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Further, method 500 may not include all the steps illustrated. In some embodiments, method 500 may not include step 510, for example, if the ERGP is preconfigured to communicate over a secure communication framework with the central ERGP.

Method 500 shall be described with reference to FIG. 1. However, method 500 is not limited to that example embodiment. One or more of the operations in the method depicted by FIG. 5 could be carried out by one or more entities, including, without limitation, central ERGP 102, ERGP 104, other server or cloud-based server processing systems and/or one or more entities operating on behalf of or in cooperation with these or other entities. One or more of the operations in the method depicted by FIG. 5 could also be carried out by one or more servers of an enterprise network and/or a cloud computing network and accessed via a client computer system that is connected thereto. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations.

In 510, central ERGP 102 may establish a secure communication framework with an ERGP corresponding to a reporting category. For example, central ERGP 102 may establish secure communication framework 106 with ERGP 104 to communicate over API integration layer 130. Secure communication framework 106 may be unique to ERGP 104.

In 520, central ERGP 102 may assign a template reporting entity to a reporting entity implemented by the ERGP. For example, central ERGP 102 may associate reporting entity 122 from ERGP 104 with template reporting entity 110 based on a predefined reporting jurisdiction or reporting category associated with reporting entity 122.

In 530, central ERGP 102 may generate configurations corresponding to the template reporting entity. For example, central ERGP 102 may generate template configurations 112 corresponding to template reporting entity 110. Template configurations 112 may include a generalized set of configurations applicable to specific reporting jurisdiction(s), specific reporting category(s), and combinations or subcombinations thereof.

In 540, central ERGP 102 may map the reporting entity implemented by the ERGP to the template reporting entity. For example, central ERGP 102 may generate mapping metadata that associates reporting entity 122 with template reporting entity 110. Central ERGP 102 may then write the mapping metadata to a mapping configuration table and store the mapping configuration table inside data store 114. For example, central ERGP 102 may append the mapping configuration table to mapping configurations 116.

In 550, central ERGP 102 may query the ERGP using an API integration layer for configurations corresponding to the reporting entity implemented by the ERGP. For example, central ERGP 102 may transmit a query to ERGP 104 via API integration layer 130 for configurations 124. Configurations 124 may be an optimized array of configurations for submitting compliant reports to obligatory reporting agency 108A based on entity data.

In 560, central ERGP 102 may generate an electronic report for the obligatory reporting agency. For example, central ERGP 102 may transmit a report generation query to ERGP 104 via API integration layer 130. Central ERGP 102 may include template configurations 112 with the report generation query. Upon receiving the report generation request, ERGP 104 may leverage report generation engine 126 to generate the electronic report using template configurations 112 and configurations 124. Central ERGP 102 may then polling ERGP 104 for the report generation status after transmitting the report generation query. Upon receiving a successful report generation status, central ERGP 102 may transmit a query to ERGP 104 to view the generated electronic report and/or download the generated electronic report, thereby completing the electronic report generation process.

In some embodiments, central ERGP 102 may then submit the generated electronic report to obligatory reporting agency 108A after generating the report. In some embodiments, central ERGP 102 may first embed the electronic report inside an editable electronic report visualization for a user using a query for viewing/editing the generated electronic report. In such embodiments, whenever the user makes an edit to the embedded electronic report through the editable electronic report visualization, central ERGP 102 may forward the edit to ERGP 104 via API integration layer

130 to mirror the edit at ERGP 104. After edits are finalized, central ERGP 102 may transmit a query to ERGP 104 to submit the edited electronic report.

Figure 6:
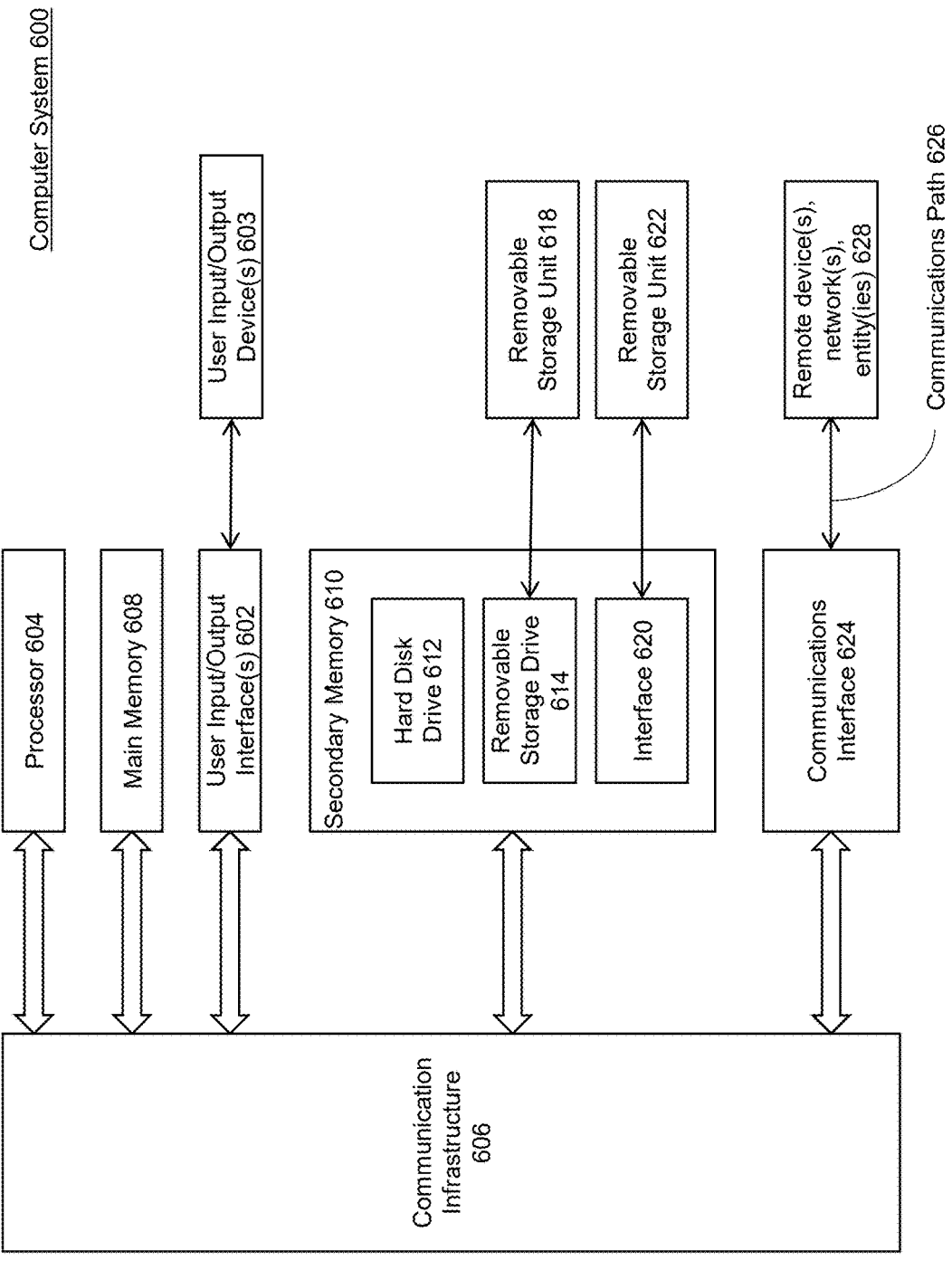
FIG. 6 illustrates an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for generating an electronic report, comprising:

establishing, by one or more processors, a secure communication framework between a central electronic report generation platform (ERGP) and a partner ERGP corresponding to a reporting category for an obligatory reporting agency, wherein the partner ERGP is external to the central ERGP;

assigning a template reporting entity to a reporting entity implemented by the partner ERGP corresponding to the reporting category;

generating, via the central ERGP, a first plurality of configurations corresponding to the template reporting entity, wherein each of the first plurality of configurations comprise a corresponding reporting category and a corresponding reporting jurisdiction;

mapping the reporting entity implemented by the partner ERGP to the template reporting entity by writing metadata into a mapping configuration table;

querying, via the central ERGP, the partner ERGP, using an application programming interface (API) integration layer over the secure communication framework, for a second plurality of configurations corresponding to the reporting entity implemented by the partner ERGP; and generating the electronic report for the obligatory reporting agency using the first plurality of configurations corresponding to the template reporting entity and the second plurality of configurations corresponding to the reporting entity implemented by the partner ERGP.

2. The computer-implemented method of claim 1, wherein the generating the electronic report comprises:

sending, using the API integration layer, a report generation request to the partner ERGP;

in response to the sending, receiving, using the API integration layer, a report generation status from the partner ERGP; and querying, using the API integration layer, the partner ERGP for the electronic report in response to the receiving, wherein the received report generation status indicates a success.

3. The computer-implemented method of claim 1, further comprising:

submitting the generated electronic report via the partner ERGP to the obligatory reporting agency in response to the generating the electronic report.

4. The computer-implemented method of claim 1, further comprising:

embedding the generated electronic report in an editable electronic report visualization, wherein an edit to the embedded generated electronic report is mirrored at the partner ERGP.

5. The computer-implemented method of claim 1, wherein each of the first plurality of configurations corresponding to the template reporting entity comprises an organizational unit or the reporting category.

6. The computer-implemented method of claim 1, wherein each of the second plurality of configurations corresponding to the reporting entity implemented by the partner ERGP comprises a reporting frequency, a reporting year, a reporting country, or a report due date.

7. The computer-implemented method of claim 1, further comprising:

generating a second electronic report for a second obligatory reporting agency using the central ERGP; and submitting the second electronic report for the second obligatory reporting agency using the central ERGP.

8. A system comprising:

one or more memories; and at least one processor each coupled to at least one of the memories and configured to perform operations comprising:

establishing a secure communication framework between a central electronic report generation platform (ERGP) and a partner ERGP corresponding to a reporting category for an obligatory reporting agency, wherein the partner ERGP is external to the central ERGP;

assigning a template reporting entity to a reporting entity implemented by the partner ERGP corresponding to the reporting category;

generating, via the central ERGP, a first plurality of configurations corresponding to the template reporting entity, wherein each of the first plurality of configurations comprise a corresponding reporting category and a corresponding reporting jurisdiction;

mapping the reporting entity implemented by the partner ERGP to the template reporting entity by writing metadata into a mapping configuration table;

querying, via the central ERGP, the partner ERGP, using an application programming interface (API) integration layer over the secure communication framework, for a second plurality of configurations corresponding to the reporting entity implemented by the partner ERGP; and generating an electronic report for the obligatory reporting agency using the first plurality of configurations corresponding to the template reporting entity and the second plurality of configurations corresponding to the reporting entity implemented by the partner ERGP.

9. The system of claim 8, wherein the generating the electronic report comprises:

sending, using the API integration layer, a report generation request to the partner ERGP;

in response to the sending, receiving, using the API integration layer, a report generation status from the partner ERGP; and querying, using the API integration layer, the partner ERGP for the electronic report in response to the receiving, wherein the received report generation status indicates a status.

10. The system of claim 8, the operations further comprising:

submitting the generated electronic report via the partner ERGP to the obligatory reporting agency in response to the generating the electronic report.

11. The system of claim 8, the operations further comprising:

embedding the generated electronic report in an editable electronic report visualization, wherein an edit to the embedded generated electronic report is mirrored at the partner ERGP.

12. The system of claim 8, wherein each of the first plurality of configurations corresponding to the template reporting entity comprises an organizational unit or the reporting category.

13. The system of claim 8, wherein each of the second plurality of configurations corresponding to the reporting entity implemented by the partner ERGP comprises a reporting frequency, a reporting year, a reporting country, or a report due date.

14. The system of claim 8, the operations further comprising:

generating a second electronic report for a second obligatory reporting agency using the central ERGP; and submitting the second electronic report for the second obligatory reporting agency using the central ERGP.

15. A non-transitory computer-readable medium having instructions stored thereon that, when executed by at least one computing device, causes the at least one computing device to perform operations comprising:

establishing a secure communication framework between a central electronic report generation platform (ERGP) and a partner ERGP corresponding to a reporting category for an obligatory reporting agency, wherein the partner ERGP is external to the central ERGP;

assigning a template reporting entity to a reporting entity implemented by the partner ERGP corresponding to the reporting category;

generating, via the central ERGP, a first plurality of configurations corresponding to the template reporting entity, wherein each of the first plurality of configurations comprise a corresponding reporting category and a corresponding reporting jurisdiction;

mapping the reporting entity implemented by the partner ERGP to the template reporting entity by writing metadata into a mapping configuration table;

querying, via the central ERGP, the partner ERGP, using an application programming interface (API) integration layer over the secure communication framework, for a second plurality of configurations corresponding to the reporting entity implemented by the partner ERGP; and generating an electronic report for the obligatory reporting agency using the first plurality of configurations corresponding to the template reporting entity and the second plurality of configurations corresponding to the reporting entity implemented by the partner ERGP.

16. The non-transitory computer-readable medium of claim 15, wherein the generating the electronic report comprises:

sending, using the API integration layer, a report generation request to the partner ERGP;

in response to the sending, receiving, using the API integration layer, a report generation status from the partner ERGP; and querying, using the API integration layer, the partner ERGP for the electronic report in response to the report generation status indicating a success.

17. The non-transitory computer-readable medium of claim 15, the operations further comprising:

submitting the generated electronic report via the partner ERGP to the obligatory reporting agency in response to the generating the electronic report.

18. The non-transitory computer-readable medium of claim 15, the operations further comprising:

embedding the generated electronic report in an editable electronic report visualization, wherein an edit to the embedded generated electronic report is mirrored at the partner ERGP.

19. The non-transitory computer-readable medium of claim 15, wherein each of the first plurality of configurations corresponding to the template reporting entity comprises an organizational unit or a reporting category.

20. The non-transitory computer-readable medium of claim 15, wherein each of the second plurality of configurations corresponding to the reporting entity implemented by the partner ERGP comprises a reporting frequency, a reporting year, a reporting country, or a report due date.

* * * * *